(12) United States Patent
Thomas

(10) Patent No.: US 6,513,835 B2
(45) Date of Patent: Feb. 4, 2003

(54) AUTOMOTIVE VEHICLE AIR BAG SYSTEM

(75) Inventor: Scott David Thomas, Novi, MI (US)

(73) Assignee: General Motors Corporation, Detroit, MI (US)

( * ) Notice: Subject to any disclaimer, the term of this patent is extended or adjusted under 35 U.S.C. 154(b) by 123 days.

(21) Appl. No.: 09/817,784

(22) Filed: Mar. 26, 2001

(65) Prior Publication Data

US 2002/0135166 A1 Sep. 26, 2002

(51) Int. Cl.⁷ .............................................. B60R 21/16
(52) U.S. Cl. ..................... 280/743.2; 280/736; 280/742
(58) Field of Search ............................. 280/728.1, 733, 280/743.1, 734, 735, 743.2, 741

(56) References Cited

U.S. PATENT DOCUMENTS

| 5,242,193 | A | * | 9/1993 | Humpal | 222/3 |
|---|---|---|---|---|---|
| 5,489,119 | A | * | 2/1996 | Prescaro et al. | 280/730.1 |
| 5,511,820 | A | * | 4/1996 | Hatfield | 280/728.1 |
| 5,570,905 | A | * | 11/1996 | Dyer | 280/743.1 |
| 5,695,214 | A | | 12/1997 | Faigle et al. | 280/735 |
| 5,762,367 | A | * | 6/1998 | Wolanin | 280/736 |
| 5,887,894 | A | | 3/1999 | Castagner et al. | 280/743.2 |
| 6,189,916 | B1 | * | 2/2001 | Bowers et al. | 280/728.2 |
| 6,237,943 | B1 | * | 5/2001 | Brown et al. | 280/728.2 |
| 6,334,627 | B1 | * | 1/2002 | Heym et al. | 280/728.1 |
| 6,419,268 | B1 | * | 7/2002 | Webert | 280/730.2 |
| 6,431,583 | B1 | * | 8/2002 | Schneider | 280/728.2 |
| 6,431,599 | B1 | * | 8/2002 | Bohn | 280/743.1 |

FOREIGN PATENT DOCUMENTS

GB          2265118 A    *  3/1993  .............. 280/743.2

* cited by examiner

Primary Examiner—Paul N. Dickson
Assistant Examiner—Toan C To
(74) Attorney, Agent, or Firm—Laura C. Hargitt

(57) ABSTRACT

There is disclosed an air bag system for an automotive vehicle. The air bag system includes a moveable member that may be selectively actuated to assist in the controlling of venting openings and tether elements of the system. In turn, the moveable member offers control over the manner of deployment of an air bag of the system.

31 Claims, 11 Drawing Sheets

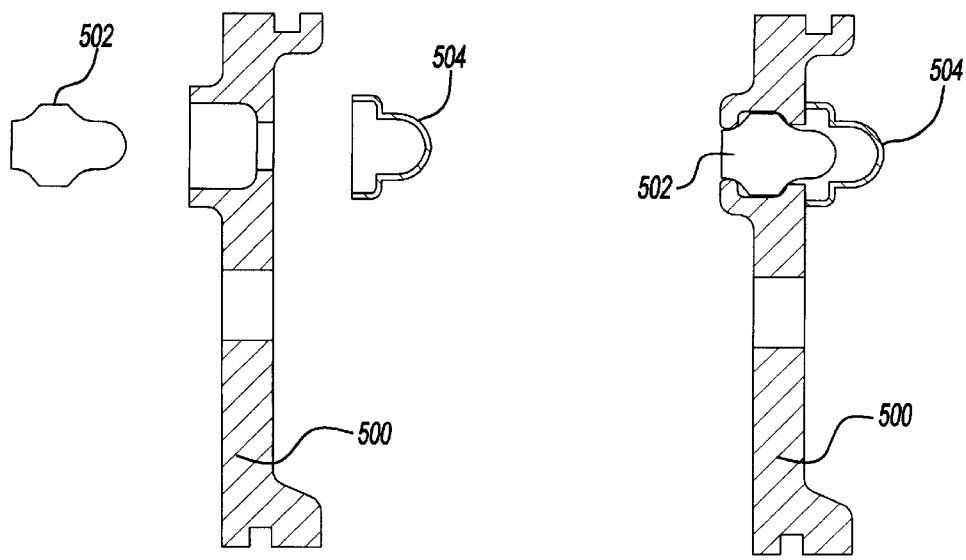
*Fig-12A*  *Fig-12B*
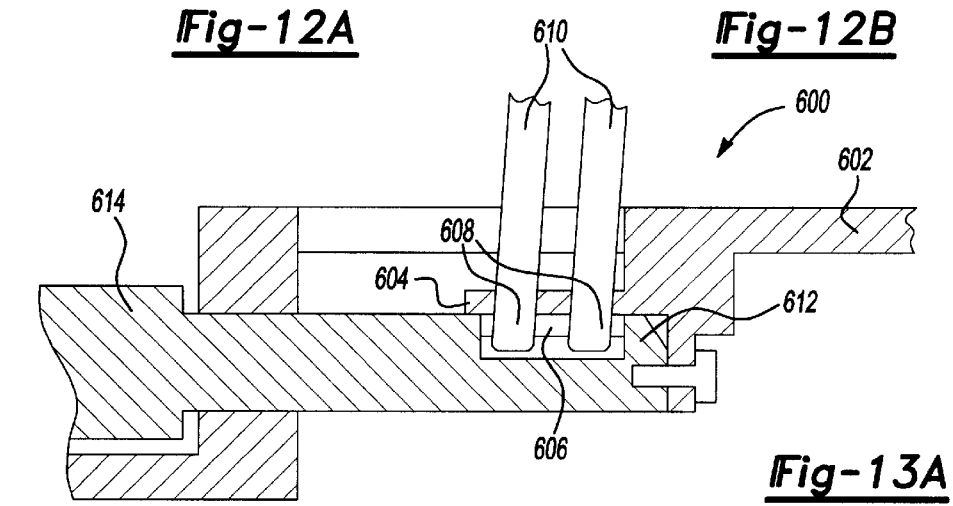
*Fig-13A*
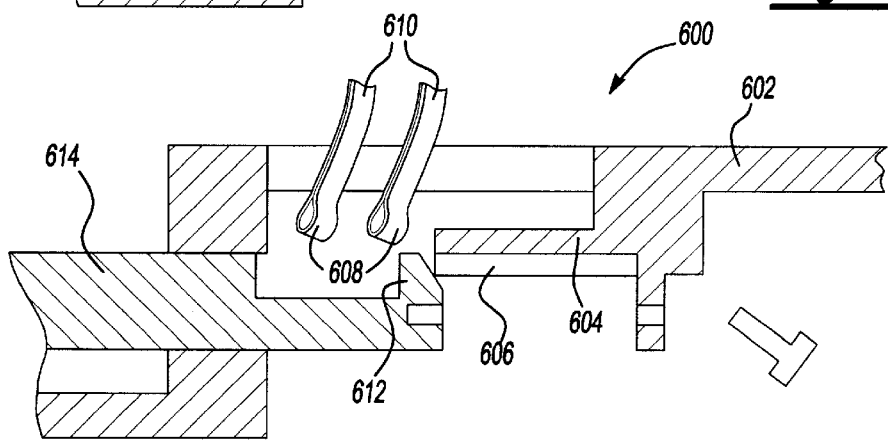
*Fig-13B*

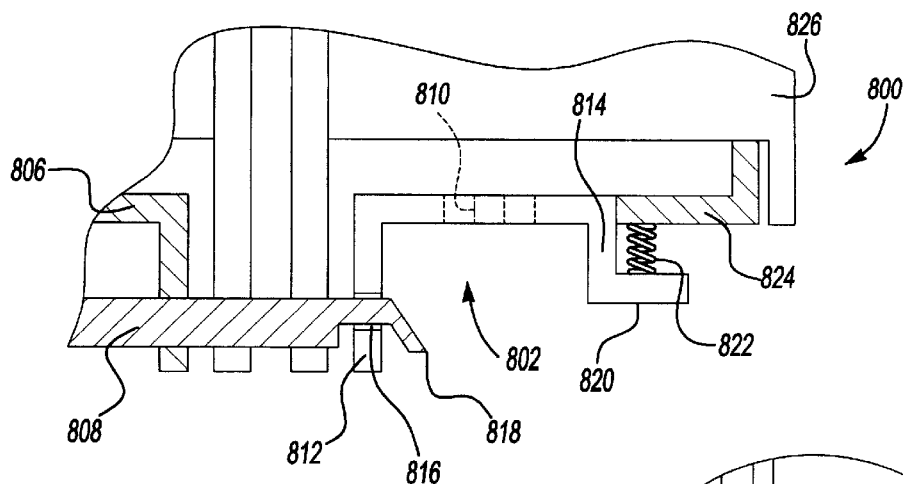
Fig-15A
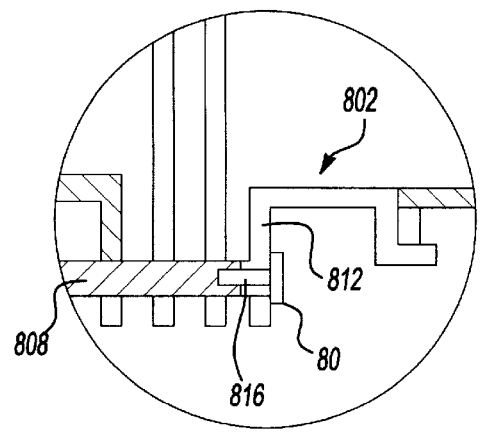
Fig-15B  Fig-15C
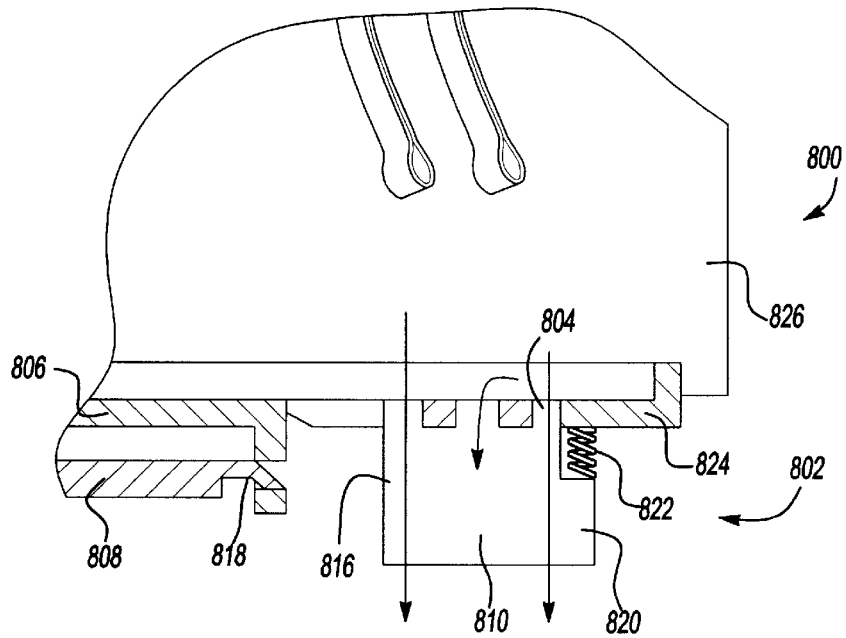

AUTOMOTIVE VEHICLE AIR BAG SYSTEM

TECHNICAL FIELD

The present invention relates to an automotive vehicle air bag system having a moveable member actuatable upon deployment of an air bag for assisting in controlling the deployment of an air bag.

BACKGROUND OF THE INVENTION

Air bag systems in automotive vehicles generally include an air bag that is designed to deploy toward a seat or seating location of the automotive vehicle when triggered by a sensor signal. For example, air bag systems might be deployed upon sudden deceleration of a vehicle or upon impact of the vehicle with another object. The art continues to investigate alternative ways to deploy air bags. For example, accelerometers have been investigated to determine when a sensor signal should signal the deployment of an air bag. Inflator assemblies have been developed to control how much gas is emitted into an air bag upon deployment.

SUMMARY OF THE INVENTION

The present invention is premised upon yet another alternative way to deploy air bags, which involves controlling the manner of deployment of an air bag. Accordingly, there is disclosed an air bag system with a gas emitting inflator for emitting inflation gas. The inflator is in signaling communication with a first sensing device for sensing a first predetermined condition. An air bag is in fluid communication with the inflator for receiving the inflation gas to inflate the air bag to a deployed state upon the occurrence of the first predetermined condition. A housing substantially surrounds the air bag and the inflator prior to inflation of the air bag. The housing generally includes a plurality of walls and can include one or more high or low pressure vent openings. A profile restraining tether element is attached to a portion of the air bag and releasably attached to a portion of the air bag system. A generally elongated moveable member is moveable from a first position to a second position for releasing the tether element from the portion of the air bag system. The moveable member includes a cap portion with dimensions corresponding to one or more of the plurality of walls of the housing for cooperatively forming a chamber. The moveable member may also include a broad portion for selectively covering the vent openings of the housing. A gas emission component is in communication with a second sensing device. The gas emission component is capable of releasing gas into the chamber to expand the chamber by moving the cap portion for moving the moveable member from the first position to the second position. The second sensing device is capable of sending signals that, based upon a second predetermined condition, assist in determining when the emission component releases gas into the chamber to move the moveable member.

These and other objects, aspects, and advantages of the present invention will become apparent upon reading the following detailed description in combination with the accompanying drawings, which depict systems and components that can be used alone or in combination with each other in accordance with the present invention.

BRIEF DESCRIPTION OF THE DRAWINGS

FIGS. 12(a)–12(b) illustrate side sectional views of the assembly of a protective shield to a moveable member for protecting a gas emission components of an air bag system.

FIGS. 13(a)–13(b) illustrate alternatives for releasably attaching tether elements within an air bag system.

FIGS. 15(a)–15(c) illustrate side sectional views of portions of an air bag system that have a venting opening door.

DESCRIPTION OF THE PREFERRED EMBODIMENT

The present invention relates to an improved air bag system and an automotive vehicle having the same. The invention is at least partially based upon advances over copending application Ser. No. 09/672,409 filed Sep. 8, 2000 and entitled, "Variable Profile Air Bag Restraint", which is herein expressly incorporated by reference, and is related to commonly owned copending application "Automotive Air Bag System", attorney docket No. GP-300491, filed on the same date as this application, which is herein expressly incorporated by reference.

Generally, the air bag system includes one or more tether elements attached to an air bag and to another portion of the system for restraining the deployment of the air bag when a more restrained deployment is desired. A moveable member is used to selectively release the one or more tether elements for a less restrained deployment of the air bag when such a deployment is desired. The moveable member is also used to selectively cover vent openings for allowing more or less gas to be emitted into the air bag.

Figure 1A:
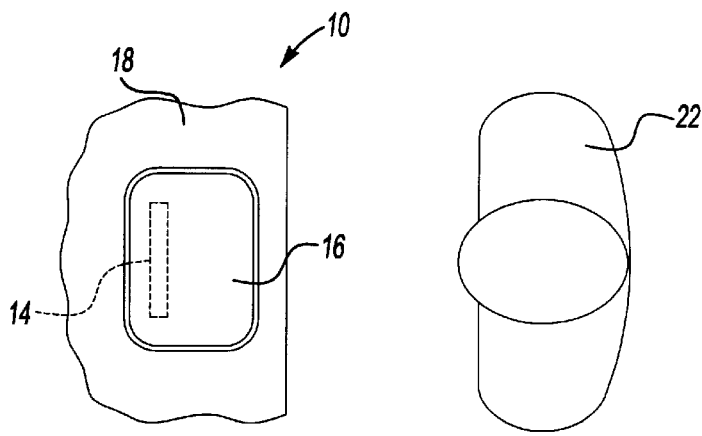
FIGS. 1(a)–1(c) illustrate top views of an illustrative air bag system to illustrate different stages of deployment.
Figure 1B:
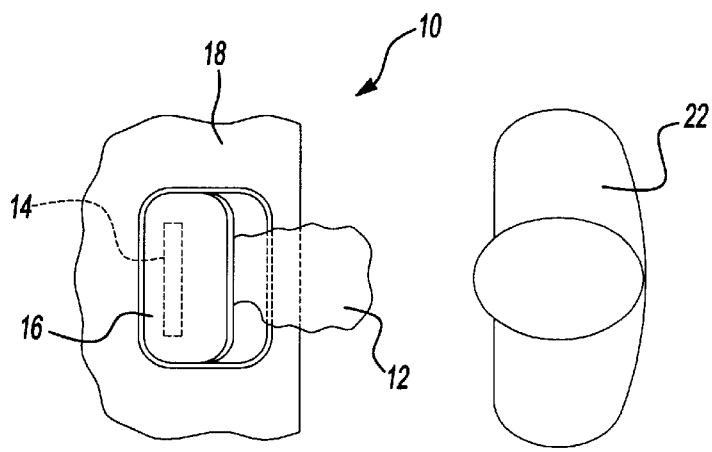
Figure 1C:
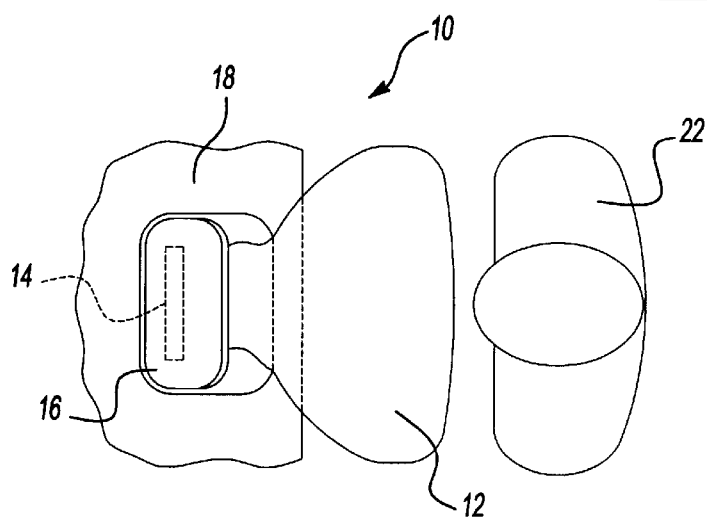

Air bag systems generally include an air bag, an inflator for emitting gas into the air bag upon a triggering signal from a triggering sensor or system, a housing for storing the air bag prior to deployment and a deployment door, which opens to allow the deployment of the bag. Referring to FIG. 1(a), 1(b) and 1(c), there is shown an air bag system 10 having an air bag 12 and a gas emitting inflator 14 for releasing gas into the air bag 12. In FIG. 1(a), the air bag 12 is in a non-deployed state and is therefore disposed behind a deployment door 16 mounted within or upon a dashboard 18 or other interior structure of an automotive vehicle (e.g. a door panel, seat, pillar or otherwise). In FIGS. 1(b) and 1(c), the air bag 12 is shown both during deployment of the bag 12 toward an individual 22 and is shown fully deployed.

The inflator 14 is in signaling communication with one or more devices for sensing a predetermined condition such as a vehicle impact, extreme deceleration or the like for triggering air bag deployment. The inflator 14 includes a suitable container (e.g. a canister) adapted for containing a gas source and one or more outlets for emitting inflation gas liberated from the source into the air bag 12 upon deployment. Thus, the container may contain compressed gas to be emitted into the bag, solid or liquid propellant that ignites thereby producing gas to be emitted into the bag 12, or a combination of compressed gas and solid propellant emitted into the bag upon the occurrence of the predetermined condition sensed by the sensor.

The air bag 12 of the system is formed of conventional air bag materials such as nylon, polyester or the like. Preferably it is a woven fabric, which may be uncoated or coated over some or all of it surfaces to selectively control density and porosity of the bag 12, and thus the release of gas from within the bag 12 during and after deployment. Such coatings are knowing in the art and may be silicone based or the like. Discrete vent holes may also be placed in the walls of the air bag 12 to assist in controlling gas release. As will be appreciated from the discussion herein, the use of selective coating or discrete vents may be substituted or used in combination with other techniques disclosed for varying the rigidity of the air bag and its rate of deployment both outward and across the air bag.

First Embodiment of the System

Figure 2A:
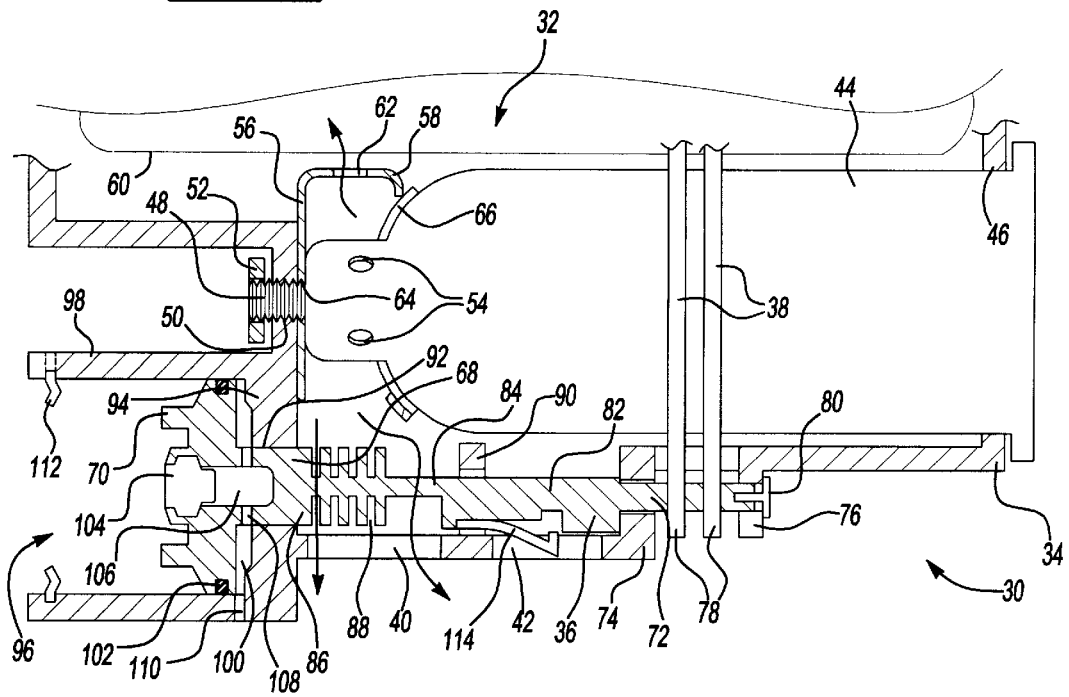
FIGS. 2(a)–2(b) illustrate side cut away views of an air bag system with particular attention to the inflator and a moveable member for selectively releasing tether elements.
Figure 2B:
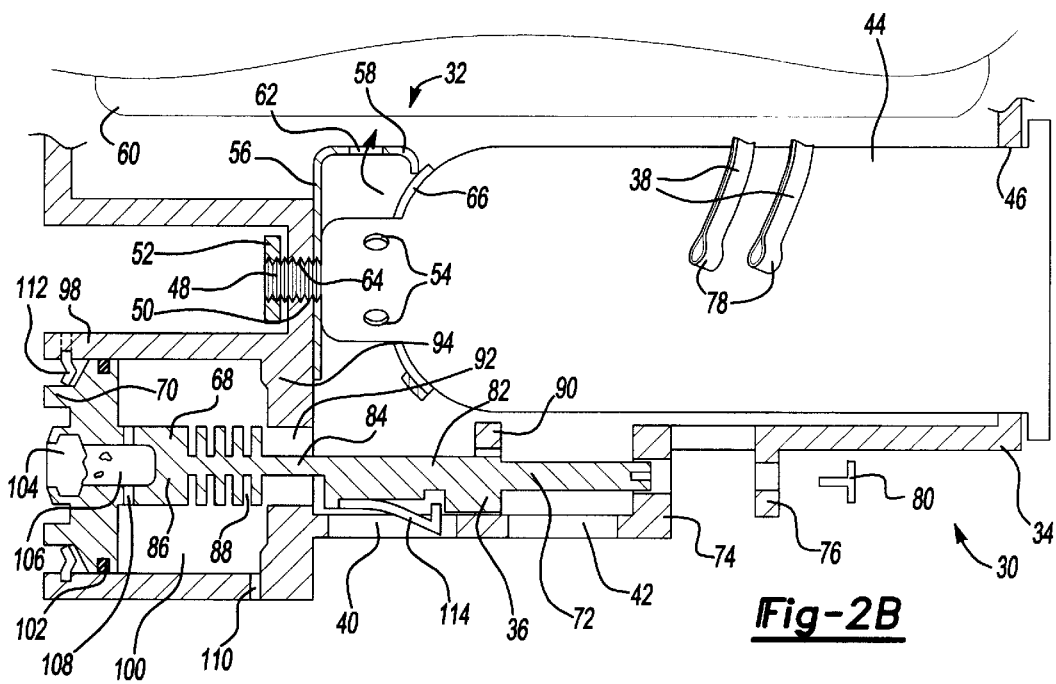

Referring to FIGS. 2(a)–2(b), there is illustrated an air bag system 30 including a gas emitting inflator 32 secured within a housing 34. The system 30 includes moveable member 36 for selectively restraining or releasing tether elements 38 and for restricting or allowing gas flow through a first (e.g. high pressure) venting opening 40 and a second (e.g. low pressure) opening 42.

The inflator 32 includes a generally cylindrical canister 44 having one end secured within a first hole 46 in the housing 34. A second end of the canister 44 includes a threaded inflator mounted stud 48 secured in a second hole 50 in the housing 34. The stud 48 is fastened to the housing 34 (e.g. with a nut 52). The canister 44 further includes one or more gas emission ports 54 for emitting gas from the canister 44.

A diffuser 56 is mounted adjacent the gas emission ports 54 for placing a wall 58 between the ports 54 and an air bag 60. In this manner gas can be dispersably emitted through a hole 62 in the wall 58. As shown, the diffuser 56 includes a hole 64 for receiving the inflator mounted stud 48 such that the diffuser 56 may be secured between the housing 34 and the canister 44. The wall 58 of the diffuser 56 abuts a seal 66 against the canister 44.

The moveable member 36 includes a body portion 68 attached to a cap portion 70. In FIG. 2(a), illustrating a first position (e.g. prior to actuation of the member 36), the moveable member 36 is shown mounted in the housing 34. The body 68 of the member 36 includes a comparatively small diameter rod 72 at one end of the member 36 that is received within openings of opposing walls 74, 76 of the housing 34 and within loops 78 of the tether elements 38 located between the walls 74, 76.

A releasable stay 80 optionally may be inserted into the rod 72 for assisting in securing the member 36 in the housing 34 prior to actuation. The stay 80 includes a cylindrical portion that is releasably inserted in a cavity of the rod 72 and a disk portion for abutting the wall 76 to assist in maintaining the moveable member 36 in its first position.

The body 68 also includes a relatively broad portion 82 that, prior to actuation, substantially covers the second venting opening 42. A relatively thin portion 84 is located adjacent the first venting opening 40 between the broad portion 82 and a neck portion 86 of the body 68. The neck portion 86 may optionally include slots 88. Additionally, the housing 34 includes a wall 90 between the first and second openings 40, 42 with an opening for receiving another portion of the body 68 of the moveable member 36.

The neck portion 86 of the body is located in an opening 92 of a generally circular wall 94 of the housing 34 for enabling a substantially airtight seal with the opening 92.

The cap portion 70 of the moveable member 36 is in the shape of a cylindrical disk. The cap 70 corresponds in shape to a cylindrical cavity 96 defined by the circular wall 94 and an annular or cylindrical wall 98 of the housing 34. The cap 70 is received in the cavity 96 for substantially enclosing a cylindrical first chamber 100. A seal (e.g. an O-ring) 102 may surround the cap 70 to provide a seal between the cap 70 and the cylindrical wall 98.

A gas emission component 104 is adjacent the first chamber 100 and is crimped into a cavity of the cap 70 to enclose a second chamber 106 within the cap 70. One such gas emission component 104 is a pyrotechnic device, such as a canister or other container of solid propellant wherein the propellant is conventionally ignited by an electrical signal, such as a signal from a sensor. The gas emission component 104 is in fluid communication with the chamber 100 through openings 108 that extend through the moveable member 36 from the second chamber 106 to the first chamber 100.

Upon deployment of the air bag 60, the moveable member 36 may or may not be actuated depending on the desired manner of deployment of the air bag 60, which will be governed by whether certain predetermined conditions have been met. Thus, actuation of the moveable member 36 may depend upon a sensing system that senses conditions inside or external of a vehicle in which the air bag system 30 is installed. A sensing system may sense objects within the vehicle such as size or location of passengers and send appropriate signals based thereon. Alternatively, the moveable member 36 may be programmed to actuate automatically upon deployment of the air bag 60 unless a signal from a sensing system signals non-actuation because of conditions sensed.

If, based upon one or more predetermined condition sensed, the moveable member 36 is not actuated, the rod 72 of the member 36 restrains the tether elements 38 thereby partially or substantially restraining the air bag 60 as it deploys toward a seat or seating location within the vehicle. Furthermore, a substantial amount of gas is vented past the thin portion 84 of the member 36 and through the first venting opening 40 which is directly adjacent to the ports 54 of the inflator 32. Thus, the air bag 60 deploys in a restrained manner with a relatively small air bag profile.

If, based upon one or more predetermined conditions sensed, the moveable member 36 is actuated, as shown in FIG. 2(b), the tether elements 38 are released for a more expanded deployment of the air bag 60 toward a seat or seating position in the vehicle or a relatively large air bag profile. More specifically, the moveable member 36 is actuated by the emission of gas from the gas emission component 104 into the first chamber 100, thus, creating higher pressure in the chamber 100 such that the cap 70 translates along the wall 98 of the housing 34. In turn, the chamber 100 is expanded and the stay 80 is forcibly removed from the rod portion 72 to allow translation of the entire member 36. Notably, an optional opening 110 may extend through the cylindrical wall 98 of the housing 34 to provide minor venting or pressure regulation to the chamber 100 during actuation of the member 36.

As the member 36 translates, the rod 72 is removed from the hole of the wall 76 and from the loops 78 of the tether elements 38 thereby releasing the tether elements 38. The broad portion 82 of the member is moved away from the second venting opening 42 to a position covering the first venting opening 40.

The second opening 42 is primarily for low pressure ride-down venting after inflation of the air bag 60. As shown, the second opening 42 is further from the ports 54 than the first opening 40 and is separated from the ports 54 by the wall 90 of the housing 34.

Once the cap 70 moves a predetermined distance along the annular wall 98, the cap 70 abuts one or more stoppers 112 for stopping the translation of the member 36. At close proximity in time, the neck portion 86 of the moveable member 36 may exit the opening 92 of the circular wall 94 allowing gas in the first chamber 100 to be vented out of the chamber 100 thereby relieving the pressure that translates the cap 70. The stoppers 112 may be bent or angled as shown such that stoppers flex allowing the cap 70 to become lodged between the stoppers 112 for preventing the member 36 from traveling in the reverse or opposite direction of its actuation translation.

Preferably, the moveable member 36 includes a secondary stay 114, which prohibits the moveable member 36 from returning toward its original non-actuated position. As shown, the secondary stay 114 in the system 30 is a cantilevered arm 114 that can be biased toward the moveable member 36 during actuation of the member 36 to allow translation of the member 36 in the actuation direction, but which, extends into the first venting opening 40 after actuation to prohibit translation of the member 36 in the opposite or reverse direction.

Thus, it can be seen from the above, that the employment of the moveable member 36 operates selectively allow at least two different levels of inflation of the air bag 60 based upon the sensing of one or more predetermined conditions such as occupant positioning within the vehicle, level of impact of the vehicle or the like.

Alternative Pre-actuation Stays

Referring to FIGS. 3(a)–3(e), there are illustrated pre-actuation stays 148, 150, 152, 154 that may be used as alternatives to the pre-actuation stay 80 of FIGS. 2(a)–2(c).

Figure 3A:
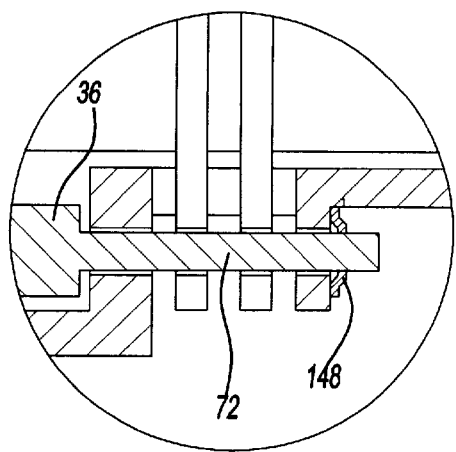
FIGS. 3(a)–3(b) respectively illustrate a side sectional and a front view of a pre-actuation stay for securing a moveable member of an air bag system.
Figure 3B:
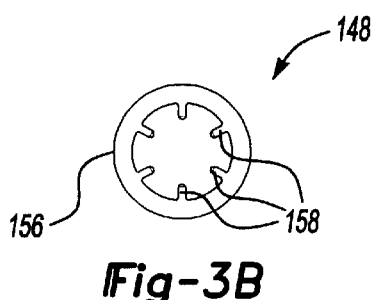

In FIGS. 3(a)–3(b), the pre-actuation stay 148 includes an annular ring 156 with a plurality of teeth 158 extending radially inward from the ring 156 for frictionally gripping the rod 72 prior to actuation of the member 36 to maintain the member 36 in its pre-actuation position. Upon actuation of the member 36, the stay 148 is forcibly slid off of the rod 72 for allowing translation of the member 36.

Figure 3C:
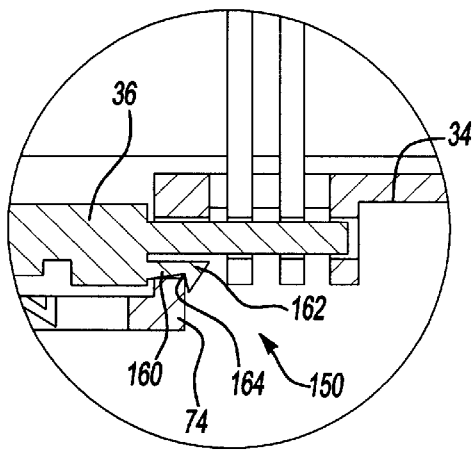
FIGS. 3(c)–3(e) illustrate side sectional views of pre-actuation stays for securing a moveable member of an air bag system.

In FIG. 3(c), the pre-actuation stay 150 includes a cantilevered arm portion 160 and a tab 162 with an angled surface 164. Prior to actuation, the cantilevered arm 160 places the angled surface 164 of the tab 162 into an interfering position (e.g., a snap fit) with the wall 74 of the housing 34, thus assisting in maintaining the member 36 in its pre-actuation position. Upon actuation, the member 36 applies a force to the arm 160, which presses the angled surface 164 against the wall 74 and the wall 74 places a force upon the surface 164 moving the arm 160 and the tab 162 toward the member 36 moving the tab 162 out of interfering position with the wall 74 allowing the member 36 to translate.

Figure 3D:
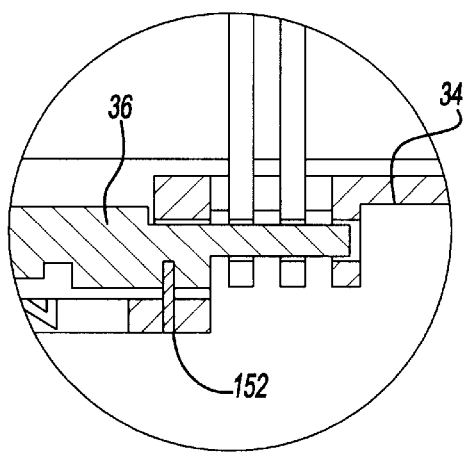

In FIG. 3(d), the pre-actuation stay 152 is a shear member 152 secured in a cavity of the housing 34 and in a cavity of the member 36 for assisting in maintaining the member 36 in its pre-actuation position. Upon actuation, the moveable member 36 applies a force in the direction of actuation to the shear member 152 sufficient to shear fracture the member 152 thus allowing the moveable member 36 to translate.

Figure 3E:
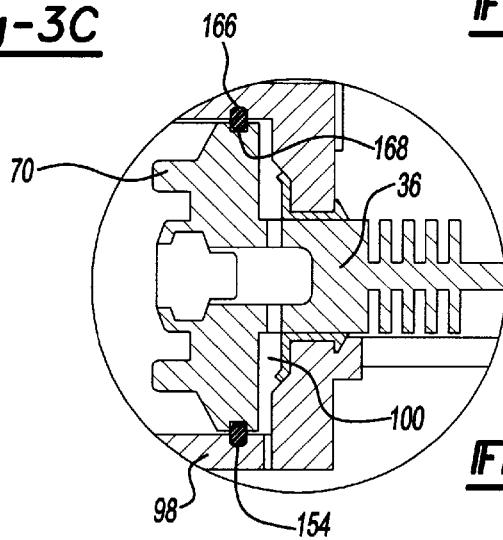

In FIG. 3(e), the pre-actuation stay 154 is an O-ring 154 that, prior to actuation, resides at least partially in both an annular cavity 166 of the wall 98 and an annular cavity 168 of the cap 70, thus, interfering with motion of the cap 70 relative to the wall 98 to assist in maintaining the member 36 in its pre-actuation position. Upon actuation, pressure produced in the chamber 100 overcomes the interference provided by the O-ring 154 and translates the moveable member 36.

Alternative Stoppers

Referring to FIGS. 4(a)–4(e) there are illustrated stoppers 186, 188, 190, 192 that may be used as the stoppers 112 of FIGS. 2(a)–2(b) or in other systems.

Figure 4A:
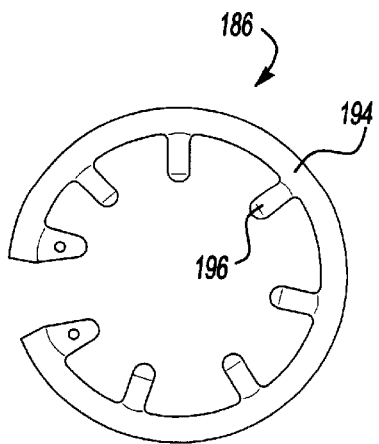
FIGS. 4(a)–4(b) illustrate frontal views of stoppers for assisting in stopping a moveable member of an air bag system.

In FIG. 4(a) and with reference to FIGS. 2(a)–2(b), the stopper 186 is integrally formed of spring steel and includes a substantially annular ring or C-shaped portion 194 having teeth 196 extending radially inward. The ring portion 194 is suitable for mounting in the wall 98 of the housing 34 such that the teeth 196 extend radially inward into the cavity 96 for stopping the actuation translation of the member 36 and, preferably, the teeth 196 are bent as previously discussed such that the cap 70 of the member 36 can become lodged between the teeth 196 for preventing the member 36 from traveling in the reverse or opposite direction of its actuation translation.

Figure 4B:
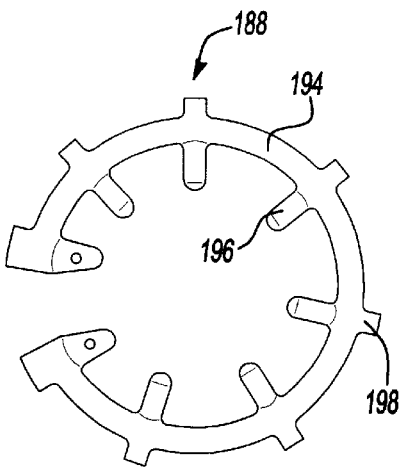

In FIG. 4(b), the stopper 188 is substantially identical to the stopper 188 of FIG. 4(a) with the exception that the stopper 188 includes flanges 198 extending radially outward from the ring portion 194 for mating with holes (not shown) in the wall 98 of the housing 34 to further secure the stopper 188 in the wall 98.

Figure 4C:
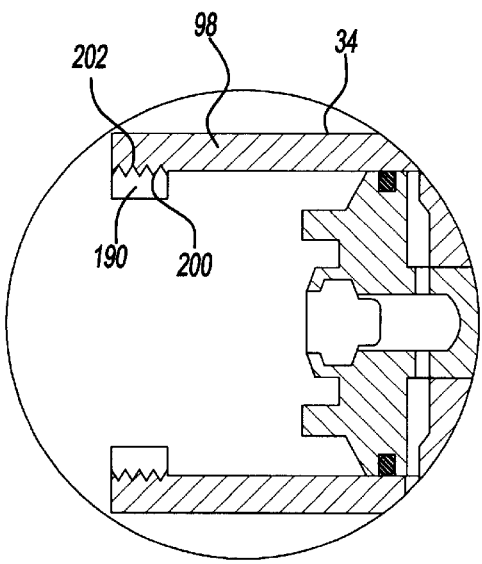
FIG. 4(c) illustrates a side sectional view of a stopper for assisting in stopping a moveable member of an air bag system.

In FIG. 4(c), the stopper 190 is an annular ring with a rectangular cross-section that has threads 200 on its outer radial surface for mating with threads 202 on the wall 98 of the housing 34 to threadably secure the stopper 190 into the wall 98.

Figure 4D:
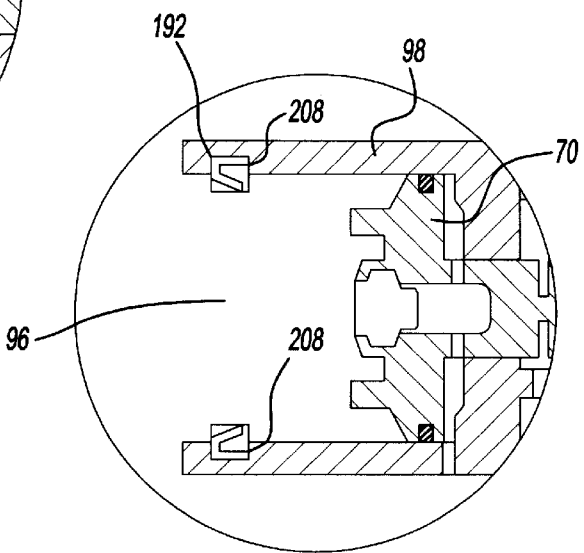
FIGS. 4(d)–4(e) respectively illustrate a side sectional view and a perspective view of a stopper for assisting in stopping a moveable member of an air bag system.
Figure 4E:
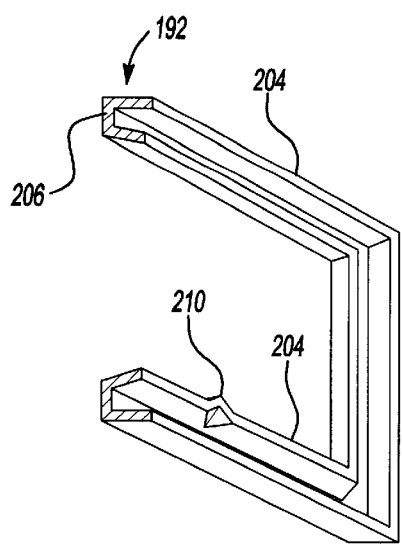

In FIGS. 4(d)–4(e), the stopper 192 is generally U-shaped and has two side walls 204 interconnected by a web wall 206. The stopper 192 is mounted in one or more cavities 208 in the wall 98 of the housing 34 and one of the side walls 204 extends in toward the cavity 96 and toward the cap 70 for interfering the travel of the cap 70 to stop the member 36. Furthermore, the stopper 192 may includes one or more bumps 210 for assisting in securing the stopper 192 in the wall 98 of the housing 34.

Chamber Vent Opening

Figure 5:
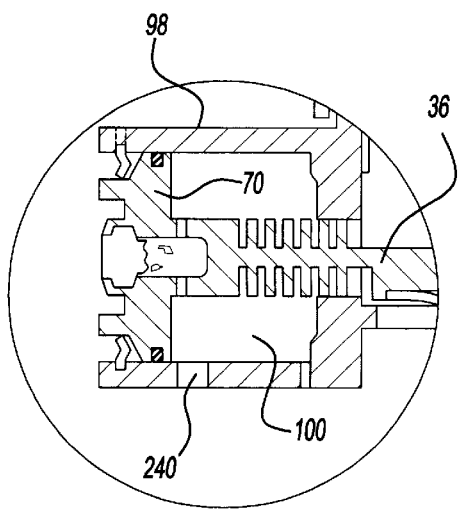
FIG. 5 illustrates a side sectional view of a portion of an air bag system having a vent opening for assisting in stopping a moveable member of an air bag system.

Referring to FIG. 5, there is illustrated a portion of an air bag system substantially identical to the air bag system 30 with the exception that an additional venting opening 240 has been formed in the wall 98 that at least partially defines the chamber 100. The venting opening 240 extends through a portion of the wall 98 that is passed by the cap 70 of the moveable member 36 toward the end of the actuation translation of the member 36 such that the opening 240 vents the chamber 100 at the end of the translation of the member 36 thereby assisting in removing the pressure from the chamber 100 and stopping the translation of the member 36.

Other Vent Openings

Figure 6:
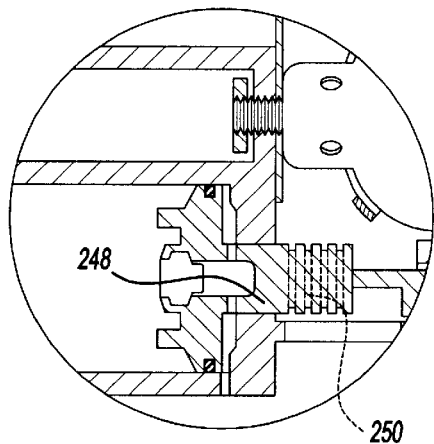
FIG. 6 illustrates a side sectional view of a portion of a moveable member having venting openings for assisting in venting of an air bag system.

Referring to FIG. 6, there is illustrated a moveable member 248 substantially identical to the moveable member 36 of FIGS. 2(a)–2(b) with the exception that the slots 88 of the member 36 of FIGS. 2(a)–2(b) have been replaced with openings 250 extending through the member 248 of FIG. 6 for allowing gas to pass through the openings 250.

Seals

Figure 7:
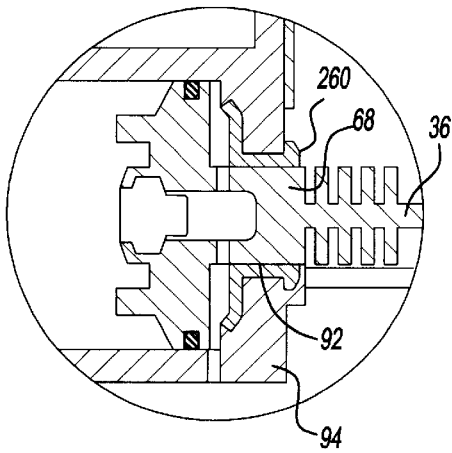
FIGS. 7 and 8 illustrate side sectional views of optional seals for use in an air bag system.

Referring to FIG. 7, a portion of the air bag system 30 of FIGS. 2(a)–2(b) is shown wherein the hole 92 in the wall 94 of the housing 34 is a least partially defined by a substantially fluid tight seal 260 (e.g., an o-ring or other seal) between the wall 94 and the neck 68 of the moveable member 36 for substantially prohibiting the passage of fluid (e.g. gas) through the hole 92 during at least a portion of the actuation of the member 36.

Figure 8:
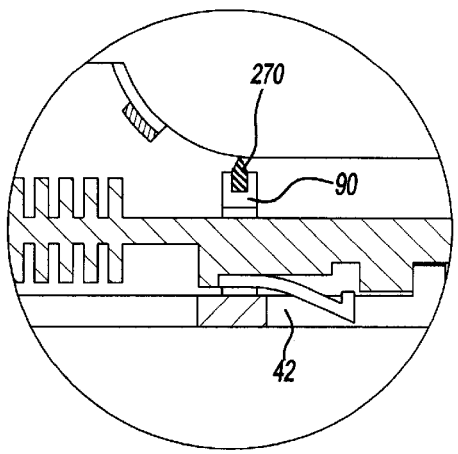

In FIG. 8, a portion of the air bag system 30 of FIGS. 2(a)–2(b) is shown wherein a seal 270 is mounted to the wall 90 between the wall 90 and the canister 44 for assisting in limiting the direct flow of gas from the ports 54 to the second ride-down opening 42 during air bag deployment.

Retention Caps

Figure 9A:
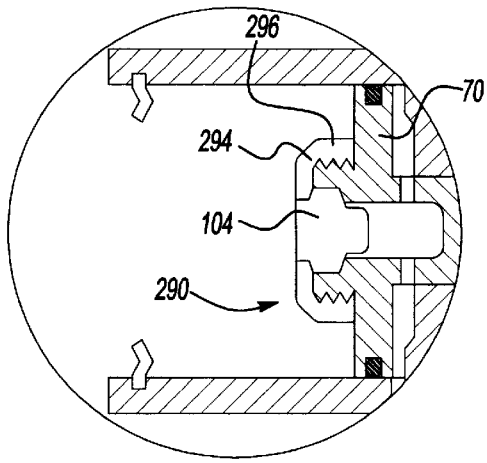
FIGS. 9(a)–9(b) illustrate side sectional views of retention members for use in an air bag system.
Figure 9B:
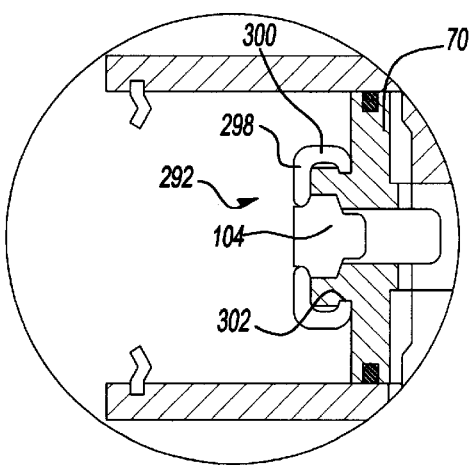

Referring to FIGS. 9(a)–9(b), the gas emission component 104 of FIGS. 2(a)–2(b) may be secured in the cap 70 of the moveable member 36 with retention members 290, 292.

In FIG. 9(a), the retention member 290 is generally annular and includes a first portion 294 extending radially inward for retaining the component 104 in the cap 70. The first portion 294 extends from a generally annular outer portion 296 that is threadably fastened to the cap 70 of the moveable member 36.

In FIG. 9(b), the retention member 292 is generally annular and includes a first portion 298 extending radially inward over the cap 70 for retaining the component 104 in the cap 70. The first portion extends from a generally annular outer ring portion 300 that clamps into a cavity 302 in the cap 70 of the moveable member 36.

Tether Element Separation Where more than one tether element is used within the air bag system, it may be desirable to keep the tether elements separated. For example, each of the tether elements may be attached or looped about a separate rod of the moveable member. A wall of the housing of the system may separate the tether elements. Additionally, a protrusion on the moveable member may separate the tether elements.

Alternative Air Bag System Housings and Components

In FIGS. 10(a)–10(d), there is illustrated an air bag system 350 comprised of a plurality of metal stampings that are welded or otherwise attached to each other. The air bag system 350 is similar to the air bag system 30 of FIGS. 2(a)–2(c) in both structure and operation. However, the system 350 includes a moveable member 352 that is located outside of a housing 354 of the system 350. The moveable member 352 includes a body 356 and a cap 358. The cap 358 is formed of a first generally circular metal stamping 360 and a second generally circular metal stamping 362. The second stamping 362 has an annular edge bent about an outer periphery of the first metal stamping 360 for assisting in securing the stampings 360, 362 together.

A gas emission component 364 is secured between the stampings 360, 362 and an optional seal (not shown) may be placed between one of the stampings 360, 362 and the gas emission component 364 for preventing gas flow through the cap 358. Each of the stampings 360, 362 includes a hole for receiving a threaded stud 366 of the body 356 of the moveable member 352. A nut 368 is threadably fastened to the stud 366 for fastening the cap 358 to the body 356, for assisting in securing the gas emission component 364 between the stampings 360, 362 and for assisting in securing the stampings 360, 362 together.

The system 350 includes another stamping 370 of the housing 354 that provides a cylindrical wall 372 and a circular wall 374 that cooperatively form a chamber 376 with the cap 358. The chamber 376 is similar to the chamber 100 of the air bag system 30 in FIGS. 2(a)–2(b) and is in fluid communication with the gas emission component 364 through a hole in the first metal stamping 360. Additionally, a seal 378 has been attached to the cap 358 for sliding engagement with the wall 372.

A neck portion 380 of the body 356 of the moveable member 352 extends through a hole 382 in the circular wall 374. The neck 380 is tapered and includes a pre-actuation stay 384 in the form of a protrusion extending from a thinner portion of the tapered neck 380.

The housing 354 may include one or more stampings 386 fitted with venting openings 388, 390 wherein passage of gas through these openings 388, 390 may be inhibited or allowed by having a broad portion 392 of the member 352 selectively align with and cover the openings 388, 390.

The system 350 also includes a diffuser 394 similar to the diffuser 56 of FIGS. 2(a)–2(b) with the exception that a wall 396 of the diffuser 394 extends from adjacent the canister 44 to a portion of the housing 354 for preventing direct flow of gas from the ports 54 of the canister 44 to the ride down vent opening 388. The diffuser 394 also may be formed as a metal stamping.

Upon actuation of the moveable member 352, the gas emission component 364 fills the chamber 376 with gas translating the member 352 and releasing the loops 78 of the tether elements 38 in a manner similar to the system 30 of FIGS. 2(a)–2(b). During actuation, the pre-actuation stay 384 is sheared of the neck 380 of the member 352 by the circular wall 374, and the tapered neck 380 of the member 352 is translated into the chamber 376.

Translation of the member 352 may be stopped in a number of ways. A larger portion of the tapered neck 380 may become lodged in the hole 382 of the circular wall 374, the broad portion 392 of the member 352 may abut the circular wall 374, a vent opening 398 may open and relieve pressure in the chamber 376 or a combination thereof.

As shown, the stamping 370 forming the chamber 376 is outside a wall 400 of the housing 354 to which the canister 44 is attached. Alternatively, the stamping 370 could replace that wall 400 in the system 350.

Components Manufactured from Alternative Processes

In alternative embodiments, components of the air bag systems are manufactured using cold headed impact processes, molding processes or casting processes.

Figure 10D:
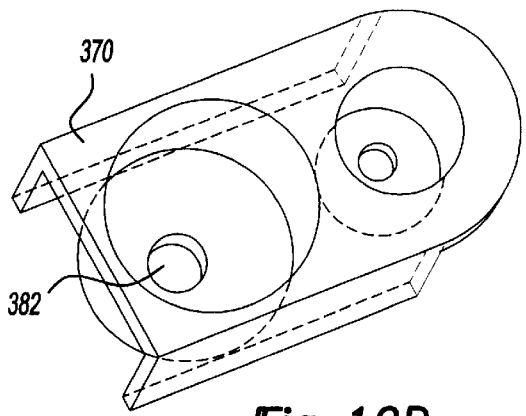
FIG. 10(d) is a perspective view of a metal stamping used in the air bag system of FIGS. 10(a)–10(b).
Figure 10A:
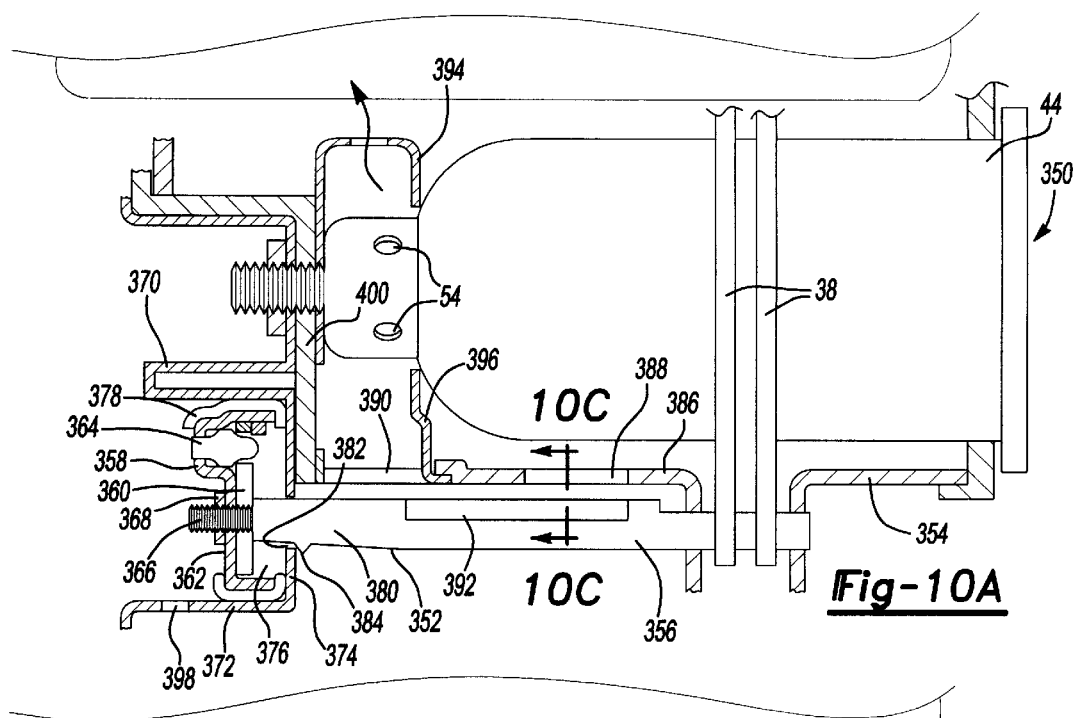
FIGS. 10(a)–10(b) illustrate cut-away views of multi-component alternative constructions of an air bag system with particular attention to the inflator and a moveable member for selectively releasing tether elements.
Figure 10B:
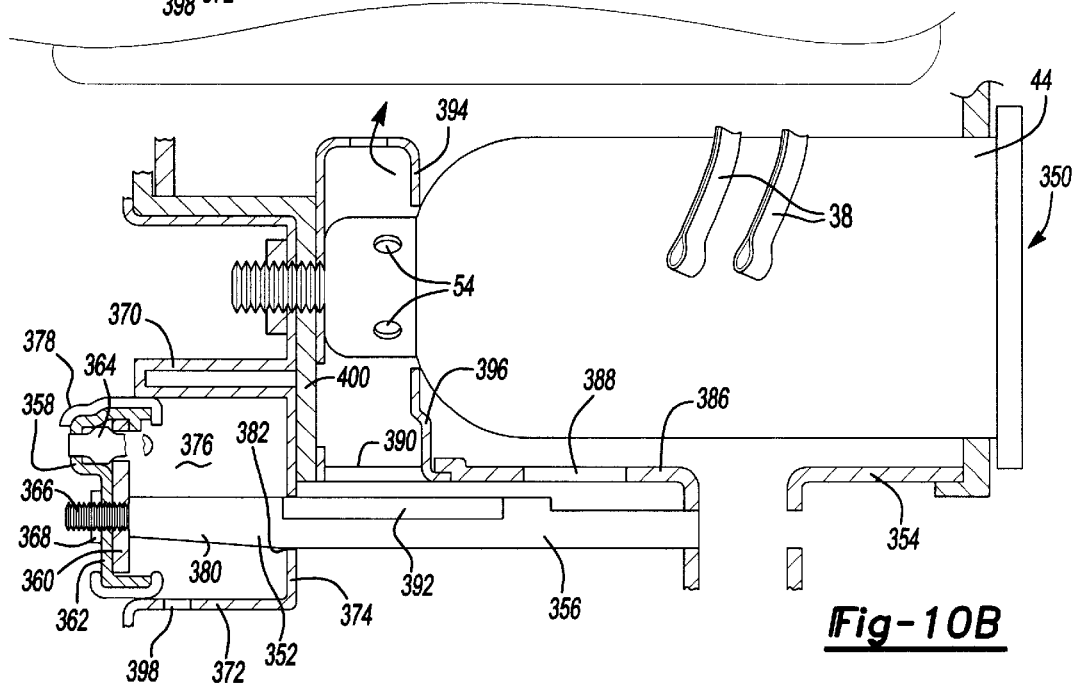
Figure 10C:
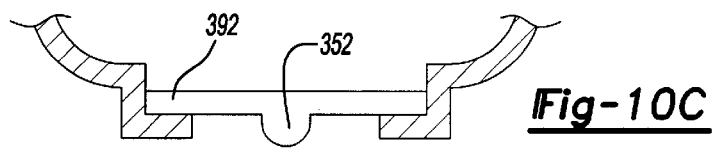
FIG. 10(c) is a sectional view of a portion of a housing and the moveable member of the air bag system of FIGS. 10(a)–10(b) taken along line 10C—10C.
Figure 11A:
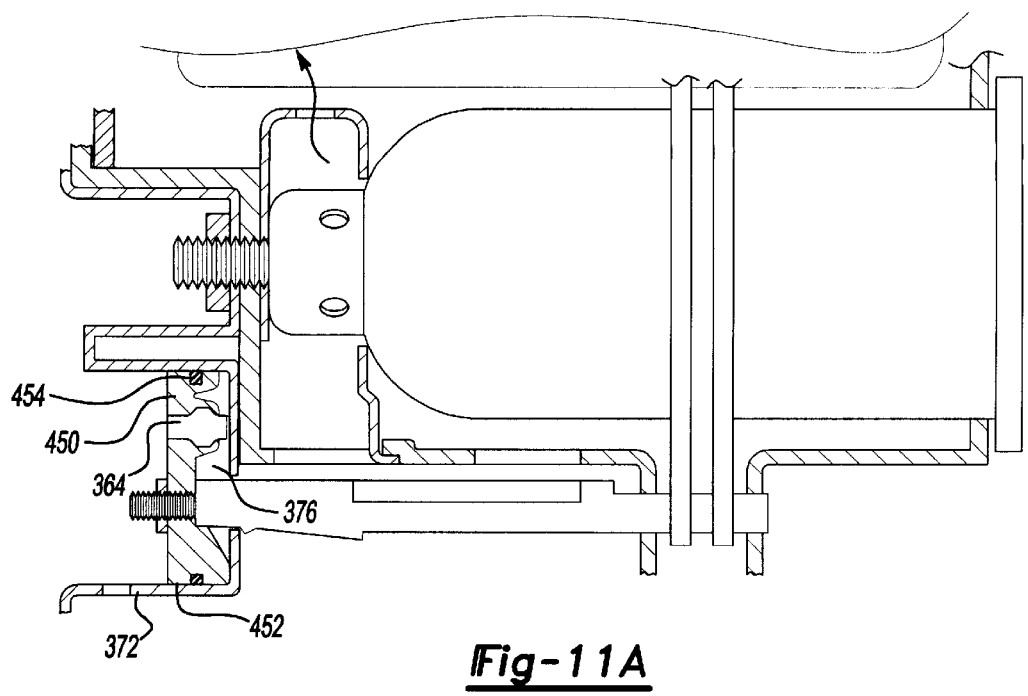
FIGS. 11(a)–11(b) illustrate side cut away views of air bag systems with components made from alternative processes.

By way of example, in FIG. 11(a), the cap 358 of the system 350 of FIGS. 10(a)–10(b) has been replaced with another cap 450. The cap 450 is formed of plastic, metal or otherwise and is formed using one of the processes disclosed in the preceding paragraph. The gas emission component 364 is crimped or otherwise fitted into a hole in the cap 450 and is in fluid communication with the chamber 376. The cap 450 includes an outer annular periphery 452 having an annular cavity for supporting an O-ring 454 for sealing between the cap 450 and the wall 372.

Figure 11B:
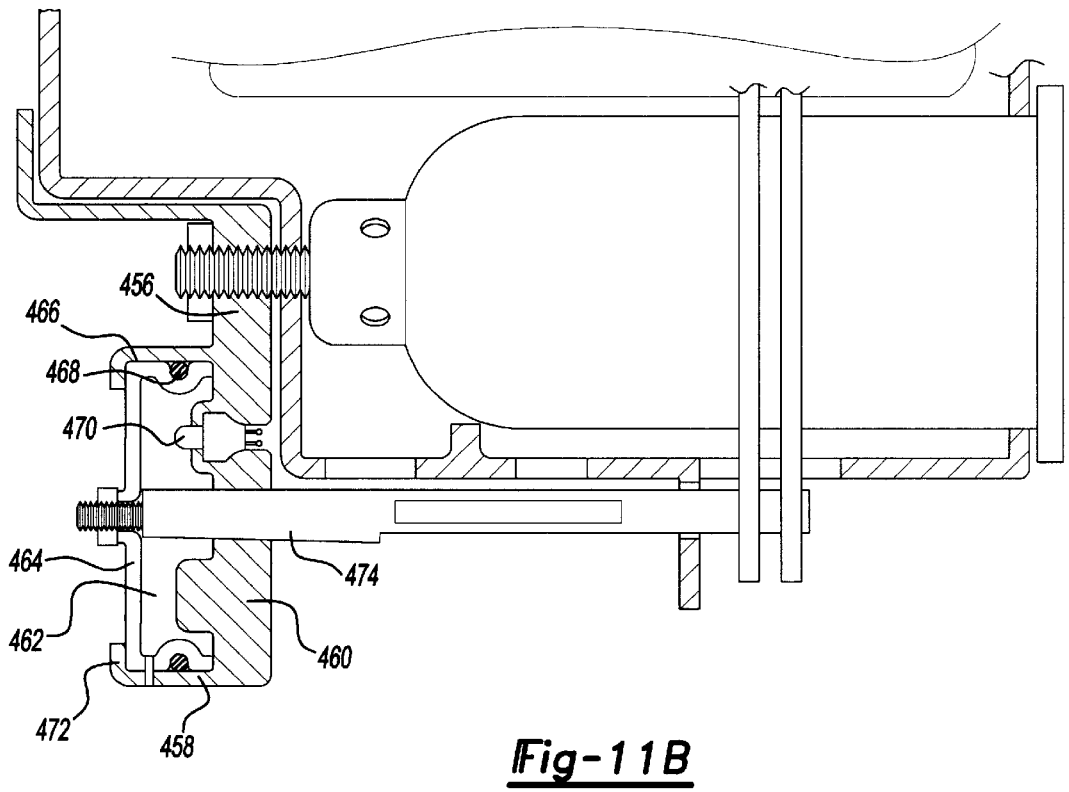

In FIG. 11(b), the stamping 370 of the housing 354 for the system 350 of FIGS. 10(a)–10(b) is replaced with a member 456 that is formed of using one of the processes disclosed in the preceding paragraph. The member 456 includes a cylindrical wall 458 and a circular wall 460 that cooperatively form a chamber 462 with a cap 464. The cap 464 is formed of a generally circular metal stamping and includes an outer annular periphery 466 having an annular cavity for supporting an O-ring 468 for sealing between the cap 464 and the wall 458. A gas emitter 470 is crimped into the member 456 for fluid communication with the chamber 462. Portions 472 (e.g., tabs or annular ring portions) of the wall 458 may be bent over the cap 464 for acting as pre-actuation stays for a moveable member 474. Such portions 472 are straightened by force applied by the cap 464 upon actuation of the member 474.

Gas Emission Component

It is desirable to protect gas emission components from environmental gasses and fluids.

In FIGS. 12(a)–12(b), there is illustrated a cap 500 with a gas emission component 502 that is secured into the cap 500 by crimping. A shield 504 is secured (e.g., welded or adhered) to one side of the cap 500 for covering and protecting at least a portion of the gas emission component 502. Alternatively, the shield 504 may be integrally formed with the cap 500.

Alternative Releasable Tether Element Attachments

Tether elements are releasably attached to a variety of components within air bag systems. To illustrate, in FIGS. 13(a)–13(b), an air bag system 600 includes a housing 602 having an elongated member 604. The elongated member 604 includes a channel 606 wherein loops 608 of tether elements 610 are looped about the elongated member 604 such that the tether elements 610 are releasably secured to the member 604 and such that a portion of the loops 608 bridge the channel 606. Upon actuation of a moveable member 614, a flange 612 of the moveable member 614 translates along the channel 606 and slides the loops 608 of the tether elements 610 off of the elongated member, thus releasing the tether elements 610.

In alternative embodiments, the loops of tether elements are looped about a variety of components and a variety of members may remove the loops. For example, loops of tether elements may be looped about a cylindrical rod of a housing and a moveable member may include an annular ring surrounding the rod for sliding the loops off the rod and releasing the tether element.

Alternative Air Bag System Constructions

Figure 14:
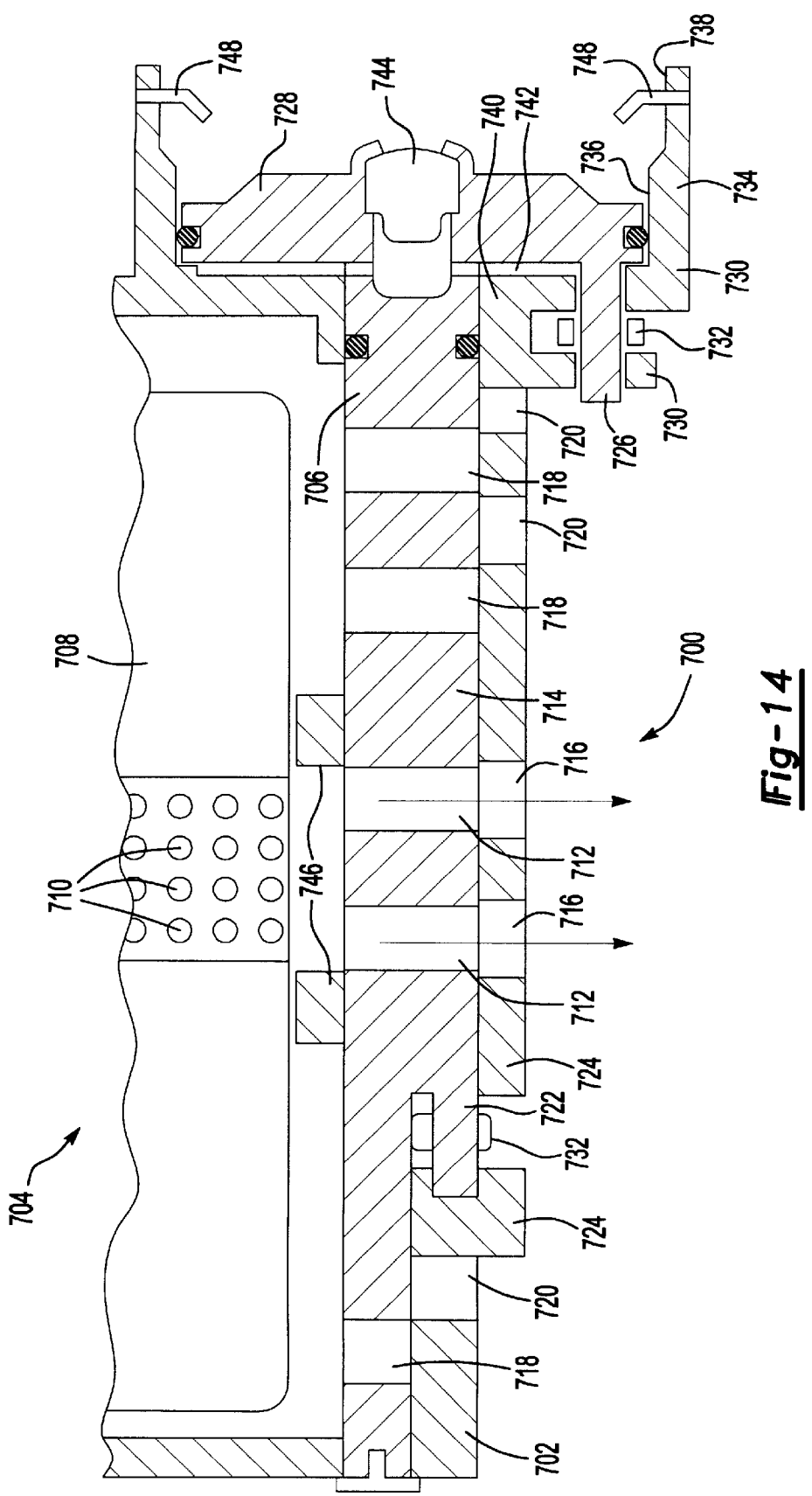
FIG. 14 illustrates a side cut away view of an alternative construction of an air bag system with particular attention to an inflator and a moveable member.

In FIG. 14, there is illustrated another alternative air bag system 700. In principle, the system 700 operates substantially similar to the system 30 of FIGS. 2(a) and 2(b). The system 700 includes a housing 702 supporting a gas emitting inflator 704 and a moveable member 706. The inflator 704 includes a generally cylindrical canister 708 having a plurality of gas emission ports 710 located approximately in the middle of the canister 708 for emitting gas from the canister 708.

The moveable member 706 includes a pair of high pressure vent openings 712 extending through a body portion 714 of the moveable member 706 for selective alignment with a pair of high pressure vent openings 716 of the housing 702. A plurality of low pressure vent openings 718 also extend through the body portion 714 for selective alignment with low pressure vent openings 720 of the housing 702.

The moveable member 706 includes a first rod portion 722 extending from the body portion 714 of the member 706 and between a pair opposing walls 724 of the housing 702 and a second rod portion 726 extending from a cap portion 728 of the moveable member 706 between another pair of opposing walls 730 of the housing 702. Loops 732 of tether elements (not shown) are releasably attached to (e.g., looped about) the rods 722, 726 between the walls 724, 730.

The housing 702 includes a cylindrical wall 734 for sliding engagement with the cap 728 of the moveable member 706 and the wall 734 includes a first annular section 736 with a first diameter and a second annular section 738 with a second diameter larger than the first diameter. The housing 702 further includes a generally circular wall 740 for cooperatively forming a chamber 742 with the cylindrical wall 734 and the cap 728 wherein the chamber 742 is capable of receiving gas from a gas emission component 744.

Prior to actuation of the moveable member 706, the high pressure vents 712 of the moveable member 706 are aligned with the high pressure vents 716 of the housing 702 between a pair of opposing walls 746 of the housing 702. The pair of walls 746 is located adjacent to and on either side of the ports 710 of the inflator 708 to guide gas from the ports 710 to the aligned openings 712, 716 for substantial venting during inflation of an air bag (not shown).

Also prior to actuation of the moveable member 706, the low pressure vent openings 718 of the moveable member 706 are out of alignment with the low pressure vent openings 720 of the housing 702 for restricting or prohibiting venting of gas through those openings 718, 720.

Upon actuation of the moveable member 706, gas is expelled from the gas emission component 744 into the chamber 742, thus translating the member 706. The low pressure vent openings 718 of the moveable member 706 align with the low pressure vent openings 720 of the housing 702 for low pressure or ride down venting, which occurs mostly after substantial inflation of an air bag (not shown) of the system 700. The high pressure vent openings 712, 716 are brought out of alignment to substantially restrict or prohibit gas flow through those openings 712, 716.

As the member 706 translates, the rods 722, 726 are removed from holes in the respective opposing walls 724, 730 of the housing 702 and from the loops 732 of the tether elements thereby releasing the tether elements.

The cap 728 translates along the smaller diameter portion 736 of the wall 734 until the cap 728 is stopped by stoppers 748 and/or until the cap 728 translate into the larger diameter portion 738 of the wall 734 to allow venting of gas between the cap 728 and the wall 734 and relieving the pressure in the chamber 742 that is translating the cap 728.

Vent Opening Door

In FIGS. 15(a)–15(b), there is illustrated a portion of an air bag system 800 having a door 802 that opens one or more vent openings 804 in a housing 806 upon actuation of a moveable member 808.

The vent opening door 802 includes a generally rectangular wall 810 with a first side wall 812 generally parallel to a second side wall 814, each side wall 812, 814 extending away from the rectangular wall 810.

The first side wall 812 includes an opening 816 for receiving a finger 818 that is attached to or is part of the moveable member 808 for maintaining the door 802 in a closed position over the openings 804. The finger 818 extends into the opening 816 and is bent to create an interference fit between the finger 818 and the first side wall 812 such that the finger acts as a pre-actuation stay for maintaining the moveable member 808 against translation prior to actuation of the member 808.

The second side wall 814 of the door 802 is integrally attached to a flange 820 extending perpendicular to the second side wall 814 and parallel to the rectangular wall 810. An optional spring 822 is compressed between the flange 820 and a wall 824 of the housing 806 for assisting in opening the door 802 upon actuation of the moveable member 808. The spring 822 may be attached to the housing 806 or may be integrally formed with the door 802.

The door 802 is swingably attached to the housing 806 with hinges (not shown) or with a portion (not shown) of flexible material (e.g., plastic, rubber or the like).

Upon actuation of the moveable member 808, the member 808 is translated such that the bend in the finger 818 is at least partially straightened, thus allowing the finger 818 to be released from the side wall 812 of the door 802. Thereafter, the door 802 is swung open by the force of gas pressure in the housing 806 or by the force of the spring 822 decompressing or both thereby allowing substantial gas from an inflator 826 to exit the housing 806 through the one or more openings 804.

In FIG. 15(*c*), there is illustrated the system 800 wherein the finger 818 of the moveable member 808 has been replaced with the pre-actuation stay 80 of FIGS. 2(*a*)–2(*b*). The stay 80 extends through the opening 816 of the side wall 812 and into a cavity of the moveable member 808. Upon actuation, of the moveable member 808 the stay 80 is removed from the cavity of the member 808 thereby allowing the door 802 to swing open.

Materials

Housings, moveable members and other component of air bag systems may be made from molded or cast plastic, elastomer, aluminum, magnesium or other suitable materials.

Alternatives

It may be advantageous to use drain holes (not shown) in one or more of the stampings, housings or other components of the air bag systems to allow draining of environmental liquids which may accumulate in the systems.

Other pre-actuation stays may be utilized which are not specifically shown. The stay may be a portion of the moveable member that is press fit into a portion of the housing. The stay may be a portion of the housing that snap or interference fits into a portion of the moveable member. The stay may be a wedge or heat stake between the member and the housing.

Any of the seals or o-rings of the present invention may be formed from rubber, elastomer, plastomer, polymer, plastic or other known suitable sealing materials. Furthermore, seals may be placed between the gas emission component and the moveable member or at any other location where the prevention of gas leakage is desired.

The housing and other components of the air bag system may be integral with each other or separate. For example, the housing of the system and the moveable member of the system may be formed of multiple separate components (e.g., stampings or cold headed components) that are attached to each other with fasteners, adhesives, welding or otherwise. Providing components in this manner can be desirable for ease of assembly and can be cost efficiency.

Actuation of the moveable member may also be accomplished with a motor, a solenoid, electromagnetic means or otherwise.

The person of skill in the art will recognize that features and aspects of air bag systems disclosed herein may be used singly or in combination as desired, needed or as may be possible.

It should be understood that the invention is not limited to the exact embodiment or construction which has been illustrated and described but that various changes may be made without departing from the spirit and the scope of the invention.

What is claimed is:

1. An air bag system comprising:

a gas emitting inflator for emitting inflation gas, said inflator in signaling communication with a first sensing device for sensing a first predetermined condition;

an air bag in fluid communication with said inflator for receiving said inflation gas to inflate said air bag to a deployed state upon the occurrence of said first predetermined condition;

a housing substantially surrounding said air bag and said inflator prior to inflation of said air bag, said housing including a plurality of walls;

a profile restraining tether element attached to a portion of said air bag and releasably retained by a portion of said air bag system;

a moveable member that is moveable from a first position to a second position for releasing said tether element from said portion of said air bag system, said moveable member having a cap portion and a generally elongated portion extending from an underside of said cap portion, said cap portion having dimensions corresponding to one or more of said plurality of walls of said housing for cooperatively forming a pressurizeable chamber between said housing and said underside of said cap portion; and a gas emission component capable of releasing gas into said pressurizeable chamber to expand said chamber by applying force to said underside of said cap portion and moving said moveable member from said first position to said second position.

2. An air bag system as in claim 1, wherein said gas emission component is in communication with a second sensing device, said second sensing device capable of sending signals that, based upon a second predetermined condition, assist in determining when said emission component releases gas into said chamber to move said moveable member and said first sensing device and said second sensing device are integrated into a single system.

3. An air bag system as in claim 1, wherein said gas emission component is in communication with a second sensing device, said second sensing device capable of sending signals that, based upon a second predetermined condition, assist in determining when said emission component releases gas into said chamber to move said moveable member and said first sensing device and said second sensing device are separate from each other.

4. An air bag system as in claim 1, wherein at least one of said plurality of walls is formed of a metal stamping.

5. An air bag system as in claim 1, wherein a seal substantially surrounds said cap portion for sealing between said cap portion and said at least one of said plurality of walls.

6. An air bag system as in claim 1, wherein said portion of said air bag system to which said tether element is releaseably retained by is a portion of said moveable member.

7. An air bag system comprising:
   a gas emitting inflator for emitting inflation gas, said inflator in signaling communication with a first sensing device for sensing a first predetermined condition;
   an air bag in fluid communication with said inflator for receiving said inflation gas to inflate said air bag to a deployed state upon the occurrence of said first predetermined condition;
   a housing substantially surrounding said air bag and said inflator prior to inflation of said air bag, said housing including a vent opening and a plurality of walls;
   a profile restraining tether element attached to a portion of said air bag and releasably retained by a portion of said air bag system;
   a moveable member that is moveable from a first position to a second position for releasing said tether element from said portion of said air bag system, said moveable member having a cap portion and a generally elongated portion extending from an underside of said cap portion, said cap portion having dimensions corresponding to one or more of said plurality of walls of said housing for cooperatively forming a pressurizeable chamber between said housing and said underside of said cap portion, and said elongated portion covering said vent opening in said housing when said moveable member is in said second position; and
   a gas emission component of releasing gas into said pressurizeable chamber to expand said chamber by applying force to said underside of said cap portion and moving said moveable member from said first position to said second position.

8. An air bag system as in claim 7, wherein said gas emission component is in communication with a second sensing device, said second sensing device capable of sending signals that, based upon a second predetermined condition, assist in determining when said emission component releases gas into said chamber to move said moveable member and said first sensing device and said second sensing device are integrated into a single system.

9. An air bag system as in claim 7, wherein said gas emission component is in communication with a second sensing device, said second sensing device capable of sending signals that, based upon a second predetermined condition, assist in determining when said emission component releases gas into said chamber to move said moveable member and said first sensing device and said second sensing device are separate from each other.

10. An air bag system as in claim 7, wherein at least one of said plurality of walls is formed of a metal stamping.

11. An air bag system as in claim 7, wherein a seal substantially surrounds said cap portion for sealing between said cap portion and said at least one of said plurality of walls.

12. An air bag system as in claim 7, wherein said portion of said air bag system to which said tether element is releaseably retained by is a portion of said moveable member.

13. An air bag system as in claim 1, wherein said tether element is released from said moveable member by moving interference with said housing as said moveable member moves from said first position to said second position.

14. An air bag system as in claim 7, wherein said moveable member prevents a substantial amount of gas from being vented through said vent opening when said moveable member is in said second position.

15. An air bag system as in claim 7, further including a releaseable stay to hold said moveable member in said first position prior to actuation of said gas emission component.

16. An air bag system as in claim 7, further including a stopper to stop said moveable member at said second position.

17. An air bag system as in claim 16, wherein said stopper further includes a retainer to hold said moveable member in said second position.

18. An air bag system as in claim 7, wherein said portion of said air bag system to which said tether element is releaseably retained by is said housing and said tether element is released by moving interference with said moveable member as said moveable member moves from said first position to said second position.

19. An air bag system as in claim 7, wherein said chamber includes a chamber vent to vent gas from said chamber upon movement of said moveable member to said second position.

20. An air bag system as in claim 19, said moveable member closes said chamber vent when said moveable member is in said first position.

21. An air bag system as in claim 7, wherein said gas emission component is secured to said moveable member.

22. An air bag system as in claim 7, wherein said gas emission component is secured to said housing.

23. An air bag system as in claim 7, wherein said moveable member includes symmetric gas channels to evenly distribute gas from said gas emission component to said pressurizeable chamber.

24. An air bag system comprising:
   a gas emitting inflator for emitting inflation gasp said inflator in signaling communication with a first sensing device for sensing a first predetermined condition;
   an air bag in fluid communication with said inflator for receiving said inflation gas to inflate said air bag to a deployed state upon the occurrence of said first predetermined condition;
   a housing substantially surrounding said air bag and said inflator prior to inflation of said air bag, said housing including a high pressure vent opening, a low pressure vent opening and a plurality of walls;
   a profile restraining tether element attached to a portion of said air bag and releasably retained by a portion of said air bag system;
   a moveable member that is moveable from a first position to a second position for releasing said tether element from said portion of said air bag system, said moveable member having a cap portion and a generally elongated portion extending from an underside of said cap portion, said cap portion having dimensions corresponding to one or more of said plurality of walls of said housing for cooperatively forming a pressurizeable chamber between said housing and said underside of said cap portion, and said elongated potion for covering said high pressure vent opening when said moveable member is in said second position and covering said low pressure vent opening when said moveable member is in said first position; and
   a gas emission component capable of releasing gas into said pressurizeable chamber to expand said chamber by applying force to said underside of said cap portion and moving said moveable member from said first position to said second position.

25. An air bag system as in claim 24, wherein said gas emission component is in communication with a second sensing device, said second sensing device capable of sending signals that, based upon a second predetermined condition, assist in determining when said emission component releases gas into said chamber to move said moveable member and said first sensing device and said second sensing device are integrated into a single system.

26. An air bag system as in claim 24, wherein said gas emission component is in communication with a second sensing device, said second sensing device capable of sending signals that, based upon a second predetermined condition, assist in determining when said emission component releases gas into said chamber to move said moveable member and said first sensing device and said second sensing device are separate from each other.

27. An air bag system as in claim 24, wherein at least one of said plurality of walls is formed of a metal stamping.

28. An air bag system as in claim 24, wherein a seal substantially surrounds said cap portion for sealing between said cap portion and said at least one of said plurality of walls.

29. An air bag system as in claim 24, wherein said portion of said air bag system to which said tether element is releaseably retained by is a portion of said moveable member.

30. An air bag system as in claim 24, wherein said moveable member prevents a substantial amount of gas from being vented through said high pressure vent opening when said moveable member is in said second position.

31. An air bag system comprising:

a gas emitting inflator for emitting inflation gas, said inflator in signaling communication with a first sensing device for sensing a first predetermined condition;

an air bag in fluid communication with said inflator for receiving said inflation gas to inflate said air bag to a deployed state upon the occurrence of said first predetermined condition;

a housing substantially surrounding said air bag and said inflator prior to inflation of said air bag, said housing including a plurality of walls and a vent door operable to open and close a vent opening in said housing;

a profile restraining tether element attached to a portion of said air bag and releasably retained by a portion of said air bag system;

a moveable member that is moveable from a first position to a second position for releasing said tether element from said portion of said air bag system, said moveable member having a cap portion and a generally elongated portion extending from an underside of said cap portion, said cap portion having dimensions corresponding to one or more of said plurality of walls of said housing for cooperatively forming a pressurizeable chamber between said housing and said underside of said cap portion, and said elongated portion operates to maintain said vent door closed when said moveable member is in said first position and to open said vent door when said moveable member is in said second position; and a gas emission component in communication with a second sensing device, said gas emission component capable of releasing gas into said pressurizeable chamber to expand said chamber by applying force to said underside of said cap portion and moving said moveable member from said first position to said second position, said second sensing device capable of sending signals that, based upon a second predetermined condition, assist in determining when said emission component releases gas into said chamber to move said moveable member.

* * * * *